Aug. 20, 1968     D. P. McNUTT     3,397,851

NUTATION DAMPER ASSEMBLY

Filed Jan. 20, 1967

INVENTOR

DOUGLAS P. McNUTT

BY *Melvin L. Crane* AGENT

*R. Sciascia* ATTORNEY

3,397,851
NUTATION DAMPER ASSEMBLY
Douglas P. McNutt, Oxon Hill, Md., assignor to the United States of America as represented by the Secretary of the Navy
Filed Jan. 20, 1967, Ser. No. 610,694
4 Claims. (Cl. 244—3.21)

ABSTRACT OF THE DISCLOSURE

A passive nutation damper for absorbing kinetic energy from an unguided rocket by means of a resonant system with viscoelastic damping. Damping takes place by use of a wheel fixed to one end of a fixed torsion bar secured normal to the rocket axis wherein the wheel is positioned for oscillatory movement in a plane along the axis of the rocket. The undamped natural frequency of the wheel and torsion bar is set slightly lower than the anticipated spin of the rocket and the torsion bar is coated with a viscoelastic plastic which dissipates energy and causes nutational movement.

The invention described herein may be manufactured and used by or for the Government of the United States of America for governmental purposes without the payment of any royalties thereon or therefor.

Background of the invention

The present invention relates to nutation damper devices and more particularly to a device for damping nutation of an unguided spinning rocket.

Heretofore, various types of nutation damping devices have been proposed for damping nutation of free spinning bodies. Among these include mercury or other fluid masses partially filling ring-shaped channels; discs or rings in sliding engagement to dissipate energy through friction; and masses movable along curved tracks which lie in a plane containing the axis of rotation. Disadvantages of such devices include the difficulty of controlling designed parameters to obtain the most effective damping, difficulty of obtaining optimum dynamic balance in the steady state; and difficulty to activate or uncage the nutation device by command signal. Such systems are generally slow systems requiring times of up to an hour to damp out nutation. Such systems are not appropriate for a rocket flight which might last only a few minutes. They are also usually appropriate only for objects having an oblate ellipsoid of inertia such as satellites or gyroscopes in which case they serve to *reduce* the nutation. This invention is designed to *increase* the nutation of an object having a prolate inertia ellipsoid.

Astronomical research has been conducted for many years to obtain information about the stars by use of unguided rockets. Various types of instrumentations have been loaded into a rocket from which the instruments look at the surrounding sky above the atmosphere or as the rocket is propelled upwardly. Such information is usually obtained as a rocket is going up then the instruments are inactivated and the instrument package is returned to earth within the rocket or ejected therefrom and parachuted to earth. The nutation damper of the present invention has been developed for use on a rocket in which the sky is scanned from above the atmosphere employing a telescope mounted to observe the sky. Heretofore, such telescopes have been mounted perpendicular to the spin axis of the rocket. As the rocket rolls and precesses, the optical axis of the telescope passes through nearly all points of the sky. Some disadvantages of having a telescope mounted normal to the axis of the rocket are: (1) the telescope points toward the earth approximately half the time thereby taking desired information only about half the time; (2) the rocket must either be fired with a slow roll rate or despun; (3) the telescope length is limited to the diameter of the rocket.

The nutation damper of the present invention permits one to mount the telescope along the spin axis of the rocket thereby the telescope looks at the sky all of the time as the rocket is coasting.

If the initial spin axis of the rocket is vertical the telescope never looks at the ground while data is being taken from above the atmosphere.

It is therefore an object of the present invention to provide a nutation damper which permits mounting a telescope along the axis of a rocket whose ellipsoid of inertia is a prolate spheroid.

Another object is to provide a nutation damper in which a fast spinning rocket may be used for carrying instrumentation which scans the sky.

Yet another object is to provide a nutation damper which is effective in a very short period of time and which requires no power to operate.

Still another object is to provide a damper device which is useful on a fast spinning rocket which precesses about the line of movement of the rocket.

While still another object is to provide a nutation damper which requires no controls from a ground station or an on-board timer.

Other objects and advantages of the invention will become apparent as the same becomes better understood from the following detailed description in conjunction with the annexed drawing wherein.

Figure 2:
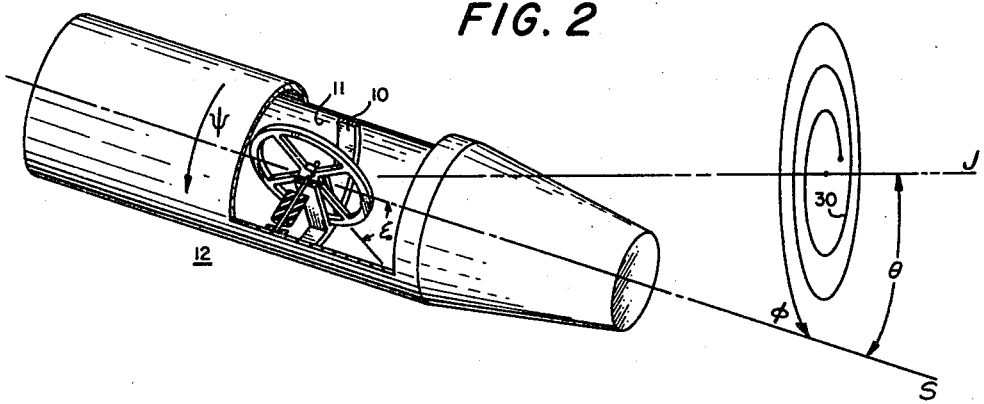
FIG. 2 represents the nutation device mounted within a rocket illustrating the rocket relationship to the direction in which the rocket is traveling.
Figure 1:
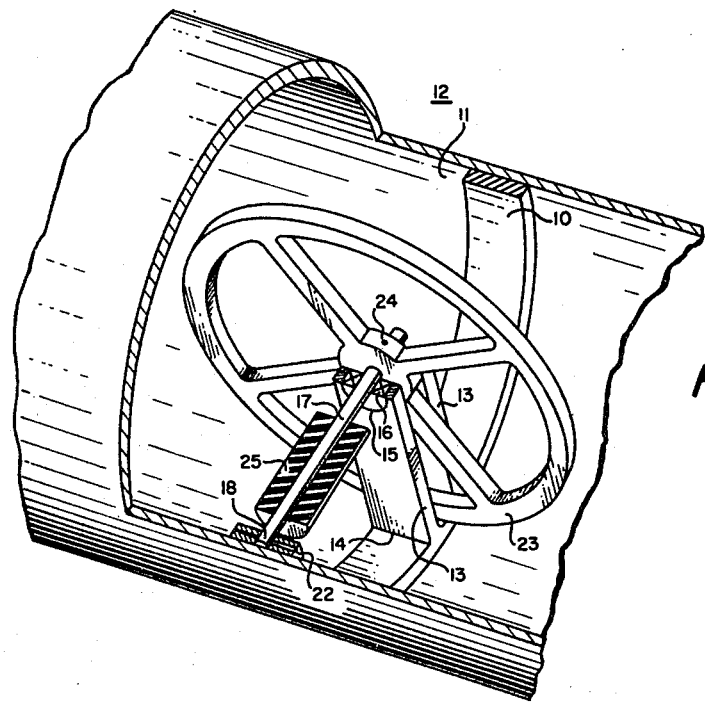
FIG. 1 is a cut-away section of a rocket illustrating the nutation device of the present invention partially in section.

The nutation damper assembly includes a cylindrical ring 10 affixed to the inner cylindrical surface 11 of a rocket 12. Two elongated rectangular flat support members 13 spaced equidistant from a plane through the linear or spin axis of the rocket are parallel thereto and extend across the area bounded by the cylindrical ring. They are secured to the cylindrical ring 10 at the ends 14 of each of the support members. Each of the support members include a centrally located aperture 15 therein within which anti-friction bearings 16 are secured. A metal torsion bar 17 extends through the bearings along a radius of the cylindrical ring and is fixedly secured at one end 18 thereof in an aperture in the cylindrical ring by use of a pin 22. A wheel 23 having a diameter substantially the diameter of the inner surface of the ring is secured on the opposite end of the torsion bar and positioned between the support members 13 such that the center of the wheel is on a plane through the axis of the rocket. The wheel is fixed by a pin 24 to the shaft for rotation therewith and the shaft is rotatable within the frictionless bearings. The portion of the torsion bar lying between one support member and the end 18 supported in the cylindrical ring is covered with a cylindrical viscoelastic plastic material 25.

As shown by illustration in FIG. 2, the configuration of the rocket is elongated and may be fast spinning about its longitudinal axis. The moment of inertia about any transverse axis is greater than that about its longitudinal axis. It is well known that such a body, if not rigid, is unstable and develops wobble or nutation which increases in time. Nutation of the fast spinning rocket produces a torque which produces rotational oscillatory motion of the damper wheel within the plane of the axis. The motion of the wheel produces torsion on the torsion bar which is resisted by the viscoelastic plastic covering on the bar. The resistance of the covering produces heat in the covering which dissipates the energy produced by motion of the rocket. Thus, the rocket is damped due to the dissipation of energy through the nutation device of the present invention.

The above-described system couples mechanical energy of the rocket into a damping device in which the equations of motion are as follows:

$$\begin{cases} (\omega - \dot{\phi}) \cos \theta = \dot{\psi} \\ (\alpha \omega_a - \dot{\phi}) \sin \theta = \beta \dot{\xi} \cos \psi \\ \dot{\theta} = \beta \dot{\xi} \sin \psi \\ \ddot{\xi}(1-\beta) + \frac{\omega_0}{Q}\dot{\xi} + \xi \omega_0^2 = \omega_a^2 \alpha (1-\alpha) \sin \theta \cos \theta \sin \psi \end{cases}$$

where $\theta$, $\psi$, $\phi$, and $\xi$ are defined in FIG. 2; $\omega_a$ is the initial spin rate of the rocket, $\alpha$ the ratio of moments of inertia of the rocket, $\beta$ the ratio of moments of inertia of the damping wheel and rocket, $\omega_0$ the resonant frequency of the wheel, and Q the damping constant of the wheel support. A dot signifies differentiation with respect to time.

In carrying out the teaching of the present invention, the nutation-damping wheel is rigidly supported onto a torsion bar for oscillatory motion in the plane of the axis of the rocket. The torsion bar is rigidly supported at the outer end thereof and extends normal to the axis of the rocket such that the nutation damping wheel is secured thereto symmetrical with the axis of the rocket between anti-friction bearings which are supported by suitable supports. The torsion bar between the rigidly supported outer end and the bearing is surrounded with a viscoelastic plastic which provides the mechanism for energy dissipation. Once the nutation damping wheel, the telescope, and any other desired equipment is secured within the rocket, the rocket is ready for firing into the atmosphere.

The rocket is mounted vertically and fired into the atmosphere with a desired spin rate about the rocket axis. As the rocket moves through the atmosphere, the axially mounted telescope continually looks directly at the sky and the rocket begins to precess about the line of travel as shown by the spiral 30 in FIG. 2. Initial precession of the rocket causes the nutation damping wheel to oscillate in the axis of the rocket. As the wheel oscillates on the torsion bar, the viscoelastic material is twisted by the movement thereby producing heat therein. The mechanical energy of the rocket produced by the wobble is dissipated by the release of heat from the viscoelastic material. This dissipation of energy causes the initial precession cone to expand and the axis of the rocket travels in a spiral path in the sky.

Obviously, many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. A nutation damping device for a spinning rocket, which comprises:
   a cylindrical frame means adapted to be secured within a rocket in coaxial relationship therewith,
   a torsion bar affixed at one end to said cylindrical frame and extending along a radius thereof and supported by and rotatable within spaced bearings provided at the opposite end,
   means for supporting said spaced bearings from said cylindrical frame,
   a wheel secured to said torsion bar between said spaced bearings with the axis of said cylindrical frame disposed for oscillatory movement in a plane normal to said torsion bar and including the axis of revolution of said cylindrical frame, and
   a torsion damping mass of viscoelastic material rigidly secured to the periphery of a longitudinal portion of said torsion bar between said wheel and the end of said torsion bar affixed to said cylindrical frame.

2. A nutation damping device as claimed in claim 1, which includes:
   spaced support elements in said frame equally spaced from a plane through the axis of revolution of said frame normal to the torsion bar, and
   said spaced bearings are supported within said support elements.

3. A nutation damper assembly for a spinning rocket, which comprises:
   a generally cylindrical frame,
   spaced supports in said frame extending along planes parallel to a plane through the center of revolution of said frame and equidistant therefrom,
   anti-friction axially aligned bearings, each secured respectively in an aperture in each of said supports, which the axis of rotation of said bearings being normal to said spaced supports,
   a torsion bar rigidly secured at one end to said frame and extending through the bearing in each of said spaced supports and rotatable therewith,
   a cylindrical wheel rigidly secured to said torsion bar, coaxial therewith and positioned symmetrically between said spaced supports, a torsion damping mass of viscoelastic plastic material secured onto said torsion bar between the end rigidly secured to said frame and the nearest bearing,
   whereby said frame is adapted to be positioned in a rocket with said wheel disposed for rotation in a plane normal to the axis of revolution of said rocket for rotational movement in a plane through the axis of said rocket.

4. A nutation damper assembly as claimed in claim 3, wherein:
   said frame is a cylindrical ring having an outside diameter the same as an inner diameter of a rocket within which the assembly is to be mounted, and
   said torsion bar is positioned along a radius of revolution of said frame and passes through the center thereof.

References Cited

UNITED STATES PATENTS

| | | | |
|---|---|---|---|
| 2,584,222 | 2/1952 | O'Connor | 74—5.5 |
| 2,592,092 | 4/1952 | Wechsler | 74—5.5 |
| 2,766,627 | 10/1956 | Lower et al. | 74—5.5 |
| 3,202,382 | 8/1965 | Chubb | 244—3.21 |

BENJAMIN A. BORCHELT, *Primary Examiner.*

T. H. WEBB, *Assistant Examiner.*